United States Patent
Jones

[15] 3,699,801
[45] Oct. 24, 1972

[54] ANEMOMETER ROTORS

[72] Inventor: John Ivor Parry Jones, Salisbury, England

[73] Assignee: The Secretary of State for Defence in her Britannic Majesty's Government of the United Kingdom of Great Britain and Northern Ireland, Whitehall, London, England

[22] Filed: Sept. 21, 1971

[21] Appl. No.: 182,396

[30] Foreign Application Priority Data

Sept. 24, 1970   Great Britain..........45,514/70

[52] U.S. Cl. ................................................73/189
[51] Int. Cl. ...............................................G01w 1/10
[58] Field of Search.....................73/189, 187, 228

[56] References Cited

UNITED STATES PATENTS

| | | |
|---|---|---|
| 3,020,963 | 2/1962 | Hakkarinen..................73/189 |
| 2,969,672 | 1/1961 | Sell et al......................73/189 |

*Primary Examiner*—James J. Gill
*Assistant Examiner*—Marvin Smollar

[57] ABSTRACT

An anemometer rotor capable of maintaining to a high order of accuracy a linear relationship of rotational speed to horizontal wind velocity by having an even number of lightweight cups, preferably six, disposed around the rotor spindle, the planes of the rims of the cups being inclined at an angle of between 25° and 40° to the rotor spindle, alternate cups being oppositely inclined.

5 Claims, 1 Drawing Figure

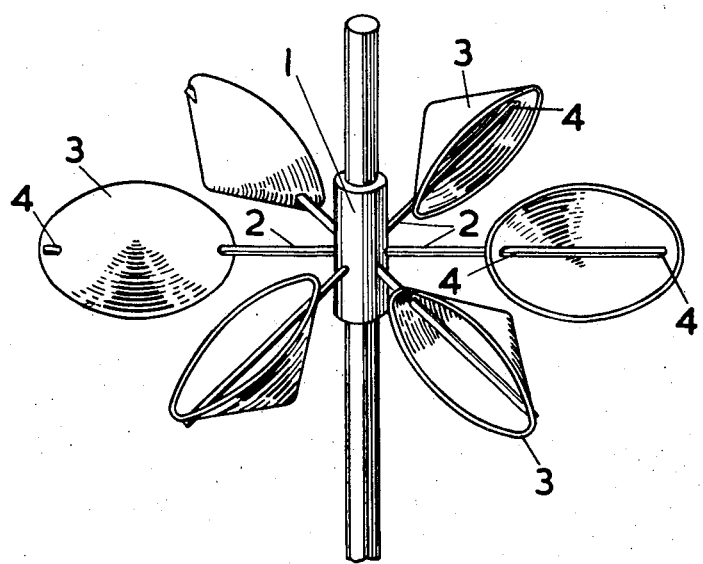

ANEMOMETER ROTORS

BACKGROUND OF THE INVENTION

This invention concerns a light-weight rotor for a cup type anemometer.

Conventional cup anemometer rotors of metal have high inertia. Improvement was effected by the Sheppard light-weight rotor (see the Journal of Scientific Instruments, 1940, Vol. 17 pp. 218–221). This is an aluminum rotor with three cups that are conical with rounded apices. Such rotors still have sufficient inertia to render them unsuitable for measuring the more rapid changes in wind speed in turbulence in the first few hundred feet above ground level.

An article in the Journal of Scientific instruments, Vol 42, June 1965 describes how improved frequency response was obtained by making the cups of a light-weight rigid material such as expanded polystyrene or a similar plastics material, such a cup having a mass of the order of one-tenth of that of a corresponding aluminum cup. The rapid response of this rotor however emphasized the pulsating character of the rotation in fluctuating wind speeds, and twelve cups were employed to reduce this effect. The rotational speed bore a good linear relationship to wind velocity but the change of rotational speed with change of angle of inclination of the wind to the horizontal departed from the cosine law. Improvement was effected by correspondingly slightly inclining the cups; thus each cup was turned about an axis extending radially from the spindle so that the plane of the circular rim of the cup was inclined at a small angle to the axis of rotation of the rotor, normally vertical in use. Alternate cups were inclined in opposite directions.

SUMMARY OF THE INVENTION

It has been found possible to further improve the linear relationship of rotational speed to horizontal wind velocity, to maintain good frequency response and a reduced deviation from the cosine law with more accurate "instantaneous" and average reading in turbulent winds while greatly reducing the number of cups — and hence the mass and inertia of the rotor — by greatly increasing the angle of inclination of the cups. Thus an anemometer rotor according to the invention has an even number less than twelve of light-weight cups, the rim of each cup being inclined at an angle between 25° and 40° to the axis of rotation of the rotor, and inclined in the opposite sense to the rim of the preceding cup. The rim of each cup is preferably inclined at an angle of substantially 30°, and the number of cups is perferably six.

DESCRIPTION OF THE PREFERRED EMBODIMENTS

One particular construction according to the invention, described by way of an example of the invention with reference to the accompanying drawing of an anemometer rotor, consists of a rotor hub 1 carrying six radial spokes 2 of glass-fiber reinforced nylon screwed and glued to the hub. The spokes 2 could of course be of some other reinforced plastic or of a light wood such as Balsa wood. Each spoke 2 carries a conical cup 3 formed from expanded polystyrene or the like, pierced by two diametrically opposite holes 4 near to its rim, threaded on the spoke 2 by these holes, turned about the spoke until the axis of the cone is at 30° to the horizontal (the rim being thus in a plane at 30° to the vertical) and glued in correct position to the spoke. Alternate cups around the rotor are oppositely inclined. The cups are for example 2½ inch (or 6½ cm) diameter at the rim, 1 inch (or 2½ cm) deep and ⅛ inch (3 mm) thick and the outside diameter of the rotor is 7 inches (or about 18 cm). For a portable anemometer which is required to be readily demounted and set up again and can be readily inverted the hub may incorporate a rolling wedge of the type described in the article "-Gravity Sensitive Fastener" published by the UK Department of Trade and Industry, Techlink No. 848, for readily securing it to the anemometer spindle. The anemometer may incorporate a ratemeter according to U.K. Pat. No. 1028494.

The invention is not of course limited to a particular number of rotor cups except that to allow for alternate forward and backward tilt the number must be even. The invention may also have application to a rotor with light metal cups.

I claim:

1. An anemometer rotor having a rotor spindle, a rotor hub attached to the said rotor spindle, an even number of spokes less than twelve extending radially from the said rotor hub and a light-weight cup attached to each spoke, each cup having a substantially planar rim whose plane is substantially parallel to its spoke and inclined at an angle between 25° and 40° to the axis of rotation of the rotor spindle, each cup being inclined in the opposite sense to that of the immediately preceding cup.

2. An anemometer rotor as claimed in claim 1 having six cups.

3. An anemometer rotor as claimed in claim 1 in which the plane of each rim is inclined to the axis of the rotor spindle at an angle of substantially 30°.

4. An anemometer rotor as claimed in claim 1 having six cups, the planes of whose rims are each inclined to the axis of the rotor spindle at an angle of substantially 30°.

5. An anemometer rotor as claimed in claim 4 in which each spoke passes through a cup at two diametrically opposite points close to the rim of the cup, the cup being substantially conical in form.

* * * * *